(12) United States Patent
Gorenstein

(10) Patent No.: US 7,035,811 B2
(45) Date of Patent: Apr. 25, 2006

(54) SYSTEM AND METHOD FOR COMPOSITE CUSTOMER SEGMENTATION

(75) Inventor: Alan K. Gorenstein, Bexley, OH (US)

(73) Assignee: Intimate Brands, Inc., Columbus, OH (US)

(*) Notice: Subject to any disclaimer, the term of this patent is extended or adjusted under 35 U.S.C. 154(b) by 177 days.

(21) Appl. No.: 09/766,636

(22) Filed: Jan. 23, 2001

(65) Prior Publication Data

US 2003/0009369 A1 Jan. 9, 2003

(51) Int. Cl.
*G06F 19/00* (2006.01)

(52) U.S. Cl. ............... 705/10; 706/6; 705/14; 705/26

(58) Field of Classification Search ............ 705/10, 705/14, 36, 26; 706/6
See application file for complete search history.

(56) References Cited

U.S. PATENT DOCUMENTS

| | | | |
|---|---|---|---|
| 5,930,762 A | 7/1999 | Masch | |
| 5,956,693 A | 9/1999 | Geerlings | |
| 5,963,910 A | 10/1999 | Ulwick | |
| 5,983,180 A | 11/1999 | Robinson | |
| 6,009,407 A | 12/1999 | Garg | |
| 6,061,658 A | 5/2000 | Chou et al. | |
| 6,073,112 A | 6/2000 | Geerlings | |
| 6,285,983 B1 | 9/2001 | Jenkins | |
| 6,298,328 B1 | 10/2001 | Healy et al. | |
| 6,334,110 B1 | 12/2001 | Walter et al. | |
| 2002/0035568 A1 | 3/2002 | Benthin et al. | |
| 2002/0042731 A1 | 4/2002 | King, Jr. et al. | |

FOREIGN PATENT DOCUMENTS

| JP | 6012426 | 1/1994 | |
|---|---|---|---|
| WO | WO 00/34889 | * 12/1999 | |
| WO | WO 01/06405 | * 1/2001 | |

OTHER PUBLICATIONS

A Theory of Multiple Classifier Systems And Its Application to Visual Word Recognition (1992) by Tin Kam Ho, from http://citeseer.nj.nec.com/ho92theory.html, downloaded Jul. 22, 2002.*

"Eleven Multivariate Analysis Techniques: Key Tools in Your Marketing Research Survival Kit" by Michael Richarme http://66.216.75.103/publ_art/Multivariate.htm, downloaded Jul. 22, 2000.*

Bayesian Model Averaging: A Tutorial (with dicussion) (360k bytes) Corrected version of the Statistical Science 14:4, 382–417 article. Jennifer A. Hoeting, David Madigan, Adrian E. Raftery and Chris T. Volinsky, Nov. 1999, downloaded Jul. 22, 2002.*

Alan Levingston, "Modern Miners Plumb for Gold", ABA Banking Journal, Dec. 1998.*

(Continued)

*Primary Examiner*—James Myhre
*Assistant Examiner*—Khanh H. Le
(74) *Attorney, Agent, or Firm*—McDermott Will & Emery LLP

(57) ABSTRACT

The profitability and effectiveness of a marketing program is increased by segmenting the customer population according to a combination of different segmentation strategies. A number of independent segmentation strategies are performed on the customers, each strategy resulting in its own set of scores. The sets of scores are then combined to form a composite score for each customer which is used to generate a ranked list of the customer population. Furthermore, different composite scores can be determined using different possible methods and these different scores can, themselves, be combined to generate an overall score and ranking for each customer. The targeted recipients for particular marketing materials are selected based on these rankings.

30 Claims, 2 Drawing Sheets

OTHER PUBLICATIONS

Jeff Morrisson, Introducing C.A.R.T. to the forecasting process "The Journal of Business Forecasting Methods & Systems" Flushing, Spring 1998, vol. 17, p. 1, pp 9–12.*

Fleet financial banks on data warehouse, Target Marketing, Philadelphia, Nov. 1998.*

Equifax launches Thin Rank, a Risk Model to Rank Order All Consumers PR Newswire, p6844, Apr. 7, 2000, Dialog File #02449611, (File 621).*

Mastering Data Mining, The Art and Science of Customer Relationship Management by Michael J.A. Berry and Gordon S. Lino 2nd edition, John Wiley and Sons, copyright 2000, pp 213–225.*

Marketing research: A state of the art review and directions for the twenty first century by Malhotra, Naresh K and others, Journal of the Academy of Marketing Science, v 27n2 pp 160–183, Spring 1999, Dialog File 15, #01795363.*

The Internet Glossary of Statistical Terms, http://www.animatedsoftware.com/statglos/statglos.htm.*

Barnoff et al., "Industry Segmentation and Predictor Motifs for Solvency Analysis of the Life/Health Insurance Industry", *Journal of Risk and Insurance*, v. 66 n. 1, pp. 99–123, Mar. 1999.

Malhotra et al., "Marketing Research: A State–of–the–Art Review and Directions for the twenty–first century", *Journal of the Academy of Marketing Science*, v. 27 n. 2, pp. 160–183, Spring 1999.

Ezop, "Database Marketing Research", *Marketing Research: A Magazine of Management & Applications*, v. 6, n. 4, pp. 34–41, Fall 1994.

Riquier et al., "Probabilistic Segmentation Modeling", *Journal of Market Research Society*, v. 39 n. 4, pp. 57–73.

Moritz et al., "Using Segmentation to Improve Sales Forecasts Based on Purchase Intent: Which Intenders Actually Buy?", *Journal of Marketing Research*, v. 29 n 4, pp. 391–405, Nov. 1992.

Grover et al., "Evaluating the Multiple Effects of Retail Promotions on Brand Loyal and Brand Switching Segments", *Journal of Marketing Research*, v. 29, n. 1 pp. 76–89, Feb. 1992.

Kopp et al., "A Competitive Structure and Segmentation Analysis of the Chicago Fashion Market", *Journal of Retailing*, V. 65 n. 4, pp. 496–515, Winter 1989.

Li, "Preventing Model Muddle (Use of Response, Risk, and Combination Models)", *Direct Marketing*, v. 52 n. 4, pp. 20–22, Aug. 1989.

Dilon et al., "LADI: A Latent Discriminant Model for Analyzing Marketing Research Date.", *Journal of Marketing Research*, v. 26 n.1, pp. 15–29, Feb. 1989.

* cited by examiner

SYSTEM AND METHOD FOR COMPOSITE CUSTOMER SEGMENTATION

FIELD OF THE INVENTION

The present invention relates to customer marketing methods and more particularly, to strategies for segmenting customers and potential customers to increase efficiency of marketing efforts.

BACKGROUND OF THE INVENTION

Marketing programs can include, for example, mail and direct mail campaigns, inbound and outbound telemarketing campaigns, and inbound and outbound web and e-mail campaigns.

In the field of customer targeting, a single segmentation method is used to attempt to select those customers who are most likely to respond to marketing programs. This initial segmentation is sometimes, but rarely, followed by a second independent segmentation to determine which customers are most likely to spend more if they respond. This second segmentation of customers is used primarily to reduce quantities of targeted customers contacted in order to meet a pre-specified criteria.

Segmentation strategies well known to one in the art can include, for example, linear models, logistic models, RFM segmentation, and CHAID (Chi-square Automatic Interaction Detection) segmentation.

Conventional wisdom in the marketing industry recognizes that each of the segmentation strategies perform better than the other strategies in certain situations depending on a number of various circumstances. Accordingly, through past experience, or by running different trials, the segmentation strategy is typically selected which optimizes, or emphasizes, the differentiation between the customer population for a desired outcome. The other, unselected segmentation strategies are then ignored because they are considered to be weaker indicators of the variance within the customer population. Within the framework of the selected segmentation strategy, additional improvements to the results can be attempted but usually only by adding additional variables to be considered during the model analysis.

In the 1930s, RFM segmentation was developed. This method of segmentation sorts customers by the Recency of their last purchase, then by the Frequency of their purchases recorded on file, and finally by the Monetary value of their purchases recorded on file. RFM segmentation, and variations thereof, are still the primary methods used today by marketers to segment customers.

With the advent of computer technology and automation, companies have begun to shift to regression based segmentation methods. These relatively new methods for segmentation involve creating variables based on customers' purchases and demographic data. Next a specific event is targeted, or identified, (e.g., the likelihood of purchasing from a particular catalog) and then, the regression is run to create a statistical model that attempts to predict the targeted event. Almost always, regression methods of segmentation provide better results than RFM segmentation.

But, if RFM segmentation produces, for example, response rates of 3%, and running a regression produces response rates of 4%, then there is still room for improving response rates to the remaining 96% of customers and potential customers that have had marketing material remitted to them. These contacted but non-responding groups represent the bulk of the expenses involved in marketing today.

SUMMARY OF THE INVENTION

While there is some value to the individual results of each conventional segmentation method, by combining multiple segmentation strategies, a synergistic effect can be realized. The value of the combined strategies is greater than any one of the independent views, resulting in consistently higher returns on marketing investments.

The present invention allows for the combination of any and all existing, and future, segmentations that independently are designed to explain variance. The inventive process yields higher marketing response rates and revenues per sale, while simultaneously allowing for lower marketing costs by reducing submission of marketing materials to unprofitable segments.

While the present invention is introduced and explained within the environment of marketing, this environment is merely exemplary and the broader concepts of the invention have applicability in any field, such as insurance and credit risk analysis, where improved customer segmentation can yield improved results and efficiencies.

Additional needs, advantages, and novel features of the present invention will be set forth in the description that follows, and in part, will become apparent upon examination or may be learned by practice of the invention. The features and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

Figure 1:
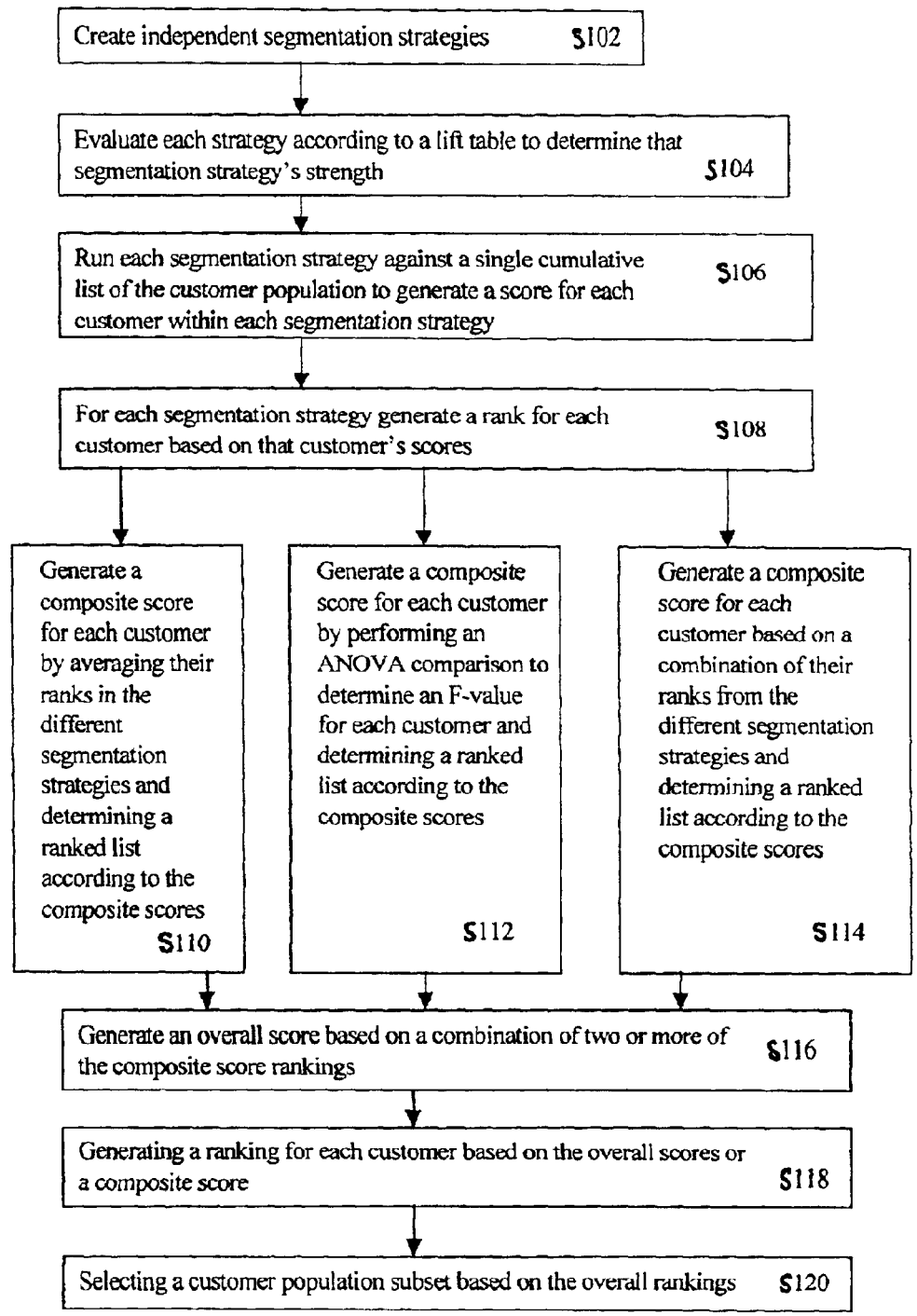
FIG. 1 illustrates a flowchart of a process for segmenting customers according to embodiments of the present invention.

The process flow illustrated in FIG. 1 depicts an exemplary method for improving customer segmentation for marketing purposes according to an embodiment of the present invention.

The exemplary flowchart of FIG. 1 begins, in step S102, with the creation of different, independent segmentation strategies. These segmentation strategies can include conventional strategies such as linear models, logistic models, RFM segmentation, CHAID segmentation, CART segmentation, etc. The different strategies can be used to independently predict a single targeted event.

Also, each single strategy can be used to predict distinct targeted events, even though the names that are selected will be used for a single pre-determined goal. For example, if two logistic processes are selected, one logistic model might target "the likelihood of responding to marketing program X" and another logistic model might target "the likelihood of responding to any marketing program during the coming year".

After the multiple segmentation strategies are created, each of the independent segmentation strategies is evaluated, in step S104, in a corresponding lift table to determine which segments of the table independently provide an acceptable level of predicted profitability.

A lift table is a chart that attempts to explain how a proposed segmentation strategy will function when it is actually used in the marketplace. In direct marketing, a lift table would show the estimated response rate, estimated average revenue per marketing piece mailed, and the estimated average value of each transaction for each segment. Each segment would be created by viewing individual ranks, or by creating groups of ranks (e.g., based on percentiles, deciles, etc.). Using a lift table, those segments which are more likely to be profitable, and by what potential degree they are likely to be profitable, can be determined.

Some or all of the independent segmentation strategies are then performed, in step S106, against a list of customers or potential customers to determine a score for each customer for each of the different targets (i.e., segmentation strategies). Unlike conventional marketing practices, results from non-optimal segmentation strategies are not discarded but, instead, are retained and used as meaningful and significant data.

The score that each customer receives from each independent segmentation strategy is determined and then stored. Many functionally equivalent methods of storing these scores, and any of the data structures described herein, can be used. Relational as well as object oriented database management systems, for example, can be used that execute on a single platform, or on a distributed computing platform. Similarly, the scores, and other data, can be stored local to the computing platform performing the segmentation strategies and analysis, or can be stored remote therefrom.

The particular format, and ranges, of the scores depend on the segmentation strategy and are considered as representative of the target variable of the strategy. For example, if the target of a segmentation strategy is "the predicted spending from catalog X", then $15.00 may be the mean predicted score. Accordingly, the scores for that strategy will be in units of dollars and their significance can be measured by their difference from $15.00. If the target variable involves "a likelihood of Y occurring", then the scores may be viewed as percentages and ranked, or sorted, accordingly.

Within each segmentation strategy, each customer is ranked, in step S108, based upon each score that has been received and recorded from that particular independent segmentation strategy. The rank assigned to a customer is, as conventionally known, a natural number indicating that customer's location in an ordered list.

Even though some of the segmentation strategies may, individually, be less optimal than others (and according to conventional wisdom, therefore, should not be considered), the present invention considers the results of different, independent segmentation strategies by combining them to generate a composite score. Such a combination of segmentation strategies can be performed in one of the following, exemplary ways or by combining two or more of the exemplary ways simultaneously or sequentially.

One way to combine the different segmentation strategies is to generate, in step S110, an average score. Each customer's ranks from the different strategies are combined in an average which results in a "rank-based score" which is, itself, then ranked. The average that is calculated can be a straight average or a weighted average based upon, for example, a relative value, or scaling factor, associated with each segmentation strategy.

Another way to combine the different segmentation strategies is to determine, in step S112, a customer's value based on some evaluation of that customer's ranking within the different segmentation strategies. For example, if a customer is in the top rank for three independent segmentation strategies and is in the bottom rank for a fourth strategy, that customer might still be considered to have a relatively high value, and therefore, selected (even if the customer's overall average rank, determined above, would have been considered "poor"). Conversely, if a customer is in the top rank for one independent segmentation strategy, the second rank for two independent segmentations, and in a bottom rank for the fourth, that customer may be considered to have a relatively low value, and therefore, not selected (even though the customer's overall average rank, determined above, would have been considered "average").

The levels, or customer values, of what are acceptable rank combinations, and what are not, can be extrapolated from the lift tables established in prior steps, or through an ANOVA (Analysis of Variance Between Groups). Using this analysis, all of the rank combinations for a customer are assigned values and, from these values, a new consolidated ranking for each customer is assigned by determining which combinations are most likely to predict events.

The test used in an ANOVA compares the variation (measured by the variance) between populations with the variation within populations. If the "between variation" is much larger than the "within variation", the means of the different populations will not be equal. If the between and within variations are approximately the same size, then there will be no significant difference between population means.

This procedure employs the F-statistic, or F-value, to test the statistical significance of the differences among the obtained means of two or more random samples from a given population. More specifically, using the Central Limit Theorem, one calculates two estimates of a population variance.

The F-statistic is formed as the ratio of these two estimates. If this ratio is sufficiently larger than 1, the observed differences among the obtained means are described as being statistically significant.

Within the exemplary marketing environment herein described, the F-statistic can be considered as a composite, or consolidated, score that takes into account all the different segmentation strategies. A ranking of the customers based on this composite score can then be performed.

For example, if there are four segmentation strategies, and each segmentation strategy has 100 five exemplary combinations of ranks could be:

| Customer Identifier | Segmentation Strategy #1 | Segmentation Strategy #2 | Segmentation Strategy #3 | Segmentation Strategy #4 |
| --- | --- | --- | --- | --- |
| 1 | 01 | 23 | 34 | 32 |
| 2 | 94 | 12 | 12 | 43 |
| 3 | 15 | 52 | 19 | 62 |
| 4 | 83 | 18 | 93 | 09 |
| 5 | 38 | 13 | 98 | 28 |

The ANOVA would assign different F-values to each of these five combinations. These F-values, therefore, represent the scores for each of the different customers. Generally, the higher the F-value, the more distinct a statement is among groups, and therefore it is considered to be a "higher" score. The customers can then be ranked according to their respective F-values.

In addition to the combinatorial methods described in steps S110 and S112, other statistical combinations of the ranks from each segmentation strategy can be used, in step S114, to generate a composite score (and rank) for each customer.

In a preferred embodiment, the results from the above two methods for consolidating different segmentation strategy results, or other exemplary methods, can themselves be combined. To combine, for example, the results from the above two methods, the ranks for each customer are calculated using the two different methods and then averaged to generate, in step S116, an overall score each customer. Again, the average could be weighted in consideration of other factors, for example, expert judgement. The customers can then be ranked, in step S118, according to their overall score.

Alternatively, the overall rankings generated in step S118 can be determined from the scores of only one composite method (e.g., steps S110, S112, and S114) or from a different combination of the composite methods than described above as the preferred embodiment.

From the ranked list of customers, a specific portion of the top ranks are selected, in step S120, to receive marketing materials. Selection of the specific portion of the top ranks could depend on factors such as a desired response rate, a desired dollar value per transaction, average revenues received per marketing contact, or necessary quantity considerations.

As mentioned earlier, conventional marketing wisdom conforms to the belief that to optimize performance only a single segmentation strategy should be created to explain a single desired outcome (for example, a desired outcome could be "respond to a specific marketing program"). The precepts of the present invention, however, are diametrically opposed to the conventional wisdom in that they provide for the simultaneous use of multiple segmenting strategies aimed at multiple desired outcomes. This novel approach to segmentation provides results that consistently surpass the methods that conform to the conventional wisdom. The customers thus selected to receive marketing materials have a far greater likelihood of maximizing the profitability of the particular marketing program than any potential subset of customers that would have been selected using only a single segmentation strategy.

Figure 2:
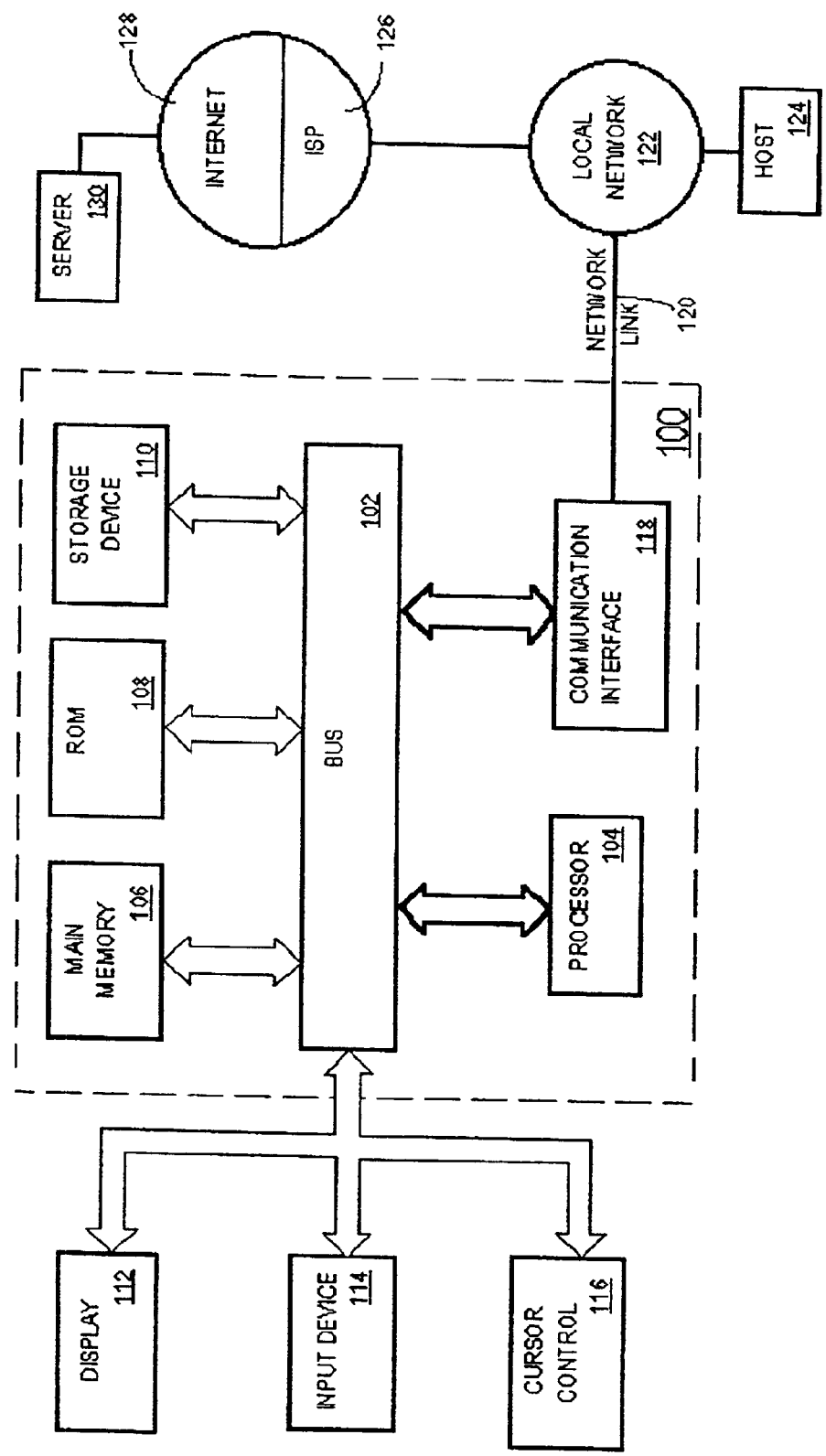
FIG. 2 illustrates an exemplary computer platform on which an embodiment of the present invention may be implemented.

FIG. 2 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 operates in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution. In this manner, computer system 100 may obtain application code in the form of a carrier wave.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims. The invention is capable of other and different embodiments and its several details are capable of modifications in various obvious respects, all without departing from the invention. Accordingly, the drawings and description are to be regarded as illustrative in nature, and not as restrictive.

What is claimed is:

1. A method for segmenting members of a population of members, comprising the steps of:
    using a computer to predict a plurality of targeted events associated with each population member by using a plurality of segmentation strategies, each targeted event being independently predicted from other targeted events of the plurality of targeted events by a respective segmentation strategy of the plurality of segmentation strategies, and generating a score associated with each prediction;
    generating a first composite score for each population member by combining each of the scores for that population member; and
    segmenting the population according to the generated first composite scores.

2. The method according to claim 1, further comprising the step of:
    generating a second composite score, different than the first composite score, for each population member, wherein the second composite score indicates variance among the population; said each second composite score being based on that population member's scores for each strategy.

3. The method according to claim 2, further comprising the step of:
    generating an overall score for each population member by combining the first and second composite scores; and
    segmenting the population according to the generated overall score.

4. The method according to claim 3, further comprising the step of:
    forwarding marketing material to a selected portion of the segmented population.

5. A method for segmenting members of a population of members, comprising the steps of:
    using a computer to predict a plurality of targeted events associated with each population member by using a plurality of segmentation strategies, each targeted event being independently predicted from other targeted events of the plurality of targeted events by a respective segmentation strategy of the plurality of segmentation strategies, and generating a score associated with each prediction;
    determining a set of scores for each population member, wherein the set of scores for a particular population member is comprised of the scores associated with each prediction for the population member;
    generating for each population member a first composite score based on that member's set of scores; and
    ranking the population members, in accordance with the first composite scores, into a first ranked list.

6. The method according to claim 5, further comprising the step of:
    selecting a portion of the population to receive marketing material based on the first ranked list.

7. The method according to claim 5, further comprising the steps of:
    identifying a plurality of segmentation strategies;
    performing lift table analysis on each of the plurality of segmentation strategies; and
    selecting a subset of the plurality of segmentation strategies based on the lift table analyses, wherein the subset comprises the more than one segmentation strategy run against the population.

8. The method according to claim 5, wherein the first composite score for each population member is an average of that member's set of scores.

9. The method according to claim 8, wherein the average is a weighted average.

10. The method according to claim 5, further comprising the step of:
    generating for each population member a second composite score, different than that member's first composite score, based on that member's set of scores.

11. The method according to claim 10, wherein the second composite score for each population member is based on an ANOVA comparison of the sets of scores.

12. The method according to claim 10, further comprising the steps of:
    generating for each population member an overall score based on the first and second composite scores for that member; and
    ranking the population members, in accordance with the overall scores, into a second ranked list.

13. The method according to claim 12, further comprising the step of:
    selecting a portion of the population to receive marketing material based on the second ranked list.

14. The method according to claim 10, further comprising the step of:
  generating for each population member a third composite score based on the sets of scores, wherein the third composite score determines variance among the sets of scores differently than the first and second composite scores.

15. The method according to claim 14, further comprising the steps of:
  generating for each population member an overall score based on at least two of the first, second and third composite scores; and
  ranking the population members in accordance with the overall scores, into a second ranked list.

16. A method for compositely segmenting members of a population, comprising the steps of:
  running more than one segmentation strategy against the population using a computer to generate for each strategy a score for each population member, each segmentation strategy providing a prediction of a different target event than other segmentation strategies of the more than one segmentation strategy;
  for each of the more than one segmentation strategy, assigning a rank to each population member according to the scores for that segmentation strategy;
  determining for each population member a set of ranks, wherein the set of ranks for a particular population member comprises the assigned rank for that particular member from each of the more than one segmentation strategy;
  generating a first composite score for each population member by averaging the set of ranks for that member;
  assigning a first composite rank to each population member in accordance with the first composite scores;
  generating a second composite score for each population member based on an ANOVA comparison of the sets of ranks;
  assigning a second composite rank to each population member in accordance with the second composite scores;
  generating an overall score for each population member by averaging the first and second composite ranks for that member; and
  ranking the population according to the overall scores.

17. The method according to claim 16, further comprising the step of:
  selecting a portion of the population as ranked in accordance to the overall score.

18. A computer readable medium bearing instructions for segmenting members of a population of members, said instructions being arranged to cause one or more processors upon execution thereof to perform the steps of:
  predicting a plurality of targeted events associated with each population member by using a plurality of segmentation strategies, each targeted event being independently predicted from other targeted events of the plurality of targeted events by a respective segmentation strategy of the plurality of segmentation strategies, and generating a score associated with each prediction;
  generating a first composite score for each population member by combining the scores for that population member from each of the more than one segmentation strategy; and
  segmenting the population according to the generated composite scores.

19. The computer readable medium of claim 18, said instructions being further arranged to cause one or more processors upon execution thereby to perform the step of:
  generating a second composite score, different than the first composite score, for each population member, wherein the second composite score indicates variance among the population; said each second composite score being based on that population member's set for each strategy.

20. The computer readable medium of claim 19, said instructions being further arranged to cause one or more processors upon execution thereby to perform the steps of:
  generating an overall score for each population member by combining the first and second composite scores; and
  segmenting the population according to the generated overall scare.

21. The computer readable medium of claim 20, said instructions being further arranged to cause one or more processors upon execution thereby to perform the step of:
  identifying a select portion of the segmented population to receive marketing material.

22. A method for segmenting members of a population of members, comprising the steps of:
  running a first segmentation strategy against a population using a computer to generate a first score for each population member, said first score indicating variance among the population;
  running a second segmentation strategy, different than said first segmentation strategy against the population to generate a second score for each population member, said second score indicating variance among the population, wherein said first score provides an indicator of variance independent of the indicator of variance provided by said second score;
  generating a first composite score for each population member by combining the respective first score and the respective second score; and
  segmenting the population according to the generated first composite scores,
  wherein the first and second segmentation strategies differ in at least one of terms of target and terms of purpose.

23. The method according to claim 22, wherein the step of generating a first composite score, further comprises the steps of:
  running a third segmentation strategy, different than the first and second segmentation strategies, against the population to generate a third score for each population member, said third score indicating variance among the population, wherein said third score provides an indicator of variance independent of the indicator of variance provided by said first and second scores; and
  combining the respective third score for each population member with the respective first and second scores when generating the first composite score.

24. The method according to claim 22, wherein the step of combining includes averaging the respective first and second scores for each population member by adding the respective first score and the respective second score and dividing the resulting sum by two.

25. The method according to claim 24, wherein either or both the first and second score are weighted by a respective factor unequal to one, prior to adding.

26. The method according to claim 22, wherein the step of generating a first composite score is accomplished using a general purpose computer executing a commercially-available statistical software package.

27. The method according to claim 22, further comprising the steps of:
   generating a respective first ranking for each population member based on the first score;
   generating a respective second ranking for each population member based on the second score;
   generating a different composite score for each population member by combining the respective first and second rankings; and
   segmenting the population according to the generated different composite scores.

28. The method according to claim 23, further comprising the steps of:
   generating a respective first ranking for each population member based on the first score;
   generating a respective second ranking for each population member based on the second score;
   generating a respective third ranking for each population member based on the third score;
   generating a different composite score for each population member by combining the respective first, second and third rankings; and
   segmenting the population according to the generated different composite scores.

29. The method according to claim 22, wherein the first and second segmentation strategies differ in terms of mathematical method.

30. A method for segmenting members of a population of members, comprising the steps of:
   running a first segmentation strategy against a population using a computer to generate a first score for each population member, said first score indicating variance among the population;
   running a second segmentation strategy, different than said first segmentation strategy against the population to generate a second score for each population member, said second score indicating variance among the population, wherein said first score provides an indicator of variance independent of the indicator of variance provided by said second score;
   generating a first composite score for each population member by combining the respective first score and the respective second score; and segmenting the population according to the generated first composite scores,
   wherein the first and second scores are combined through regression.

* * * * *